Patented Dec. 31, 1935

2,026,386

UNITED STATES PATENT OFFICE 2,026,386

TREATMENT OF RUBBER

Louis H. Howland, Nutley, N. J., assignor to United States Rubber Company, New York, N. Y., a corporation of New Jersey No Drawing. Application January 23, 1935, Serial No. 3,048

14 Claims. (Cl. 18—50)

This invention relates to the treatment of rubber whereby to improve its resistance against the deteriorating influences of heat, light and/or air. More particularly the invention is concerned with providing age-resistors which possess the property of inhibiting fatigue failure or cracking due to repeated flexing of the rubber, particularly where the rubber is combined with more than 30 parts of carbon black per 100 parts by weight of rubber as in the case of the tread portion of vehicle tires.

The new age resistors or antioxidants are the products resulting from treating the product of reaction of a ketone and an amine with an alkali metal in the metallic state. The ketone-amine may be prepared in the presence or absence of a reaction catalyst, using various proportions of amine to ketone, and condensed either under reflux or in an autoclave at elevated temperatures, all of which is known in the art. The treatment with alkali-metal is carried out preferably after removal of water and unreacted chemicals, and either before or after neutralization or washing with aqueous alkaline solutions. The products of treatment with alkali-metal are different from the products obtained by treating a ketone-amine with alkaline solutions.

The products of reaction of ketones with amines are generally multi-component mixtures of complex character. When treated with an alkali-metal, it is believed that some if not all of the components undergo molecular condensation and/or rearrangement and in the case of the liquid products, an increase in the viscosity of the product results. Such change in properties is illustrated by the treatment of aliphatic ketone-aromatic secondary amine reaction products. For example in the case of an acetone-diphenylamine reaction product having a viscosity of 294 poises,—washing with aqueous sodium hydroxide and drying increased the viscosity of the product to 670 poises,—whereas treatment of the acetone-diphenylamine with 1% by weight of sodium (metallic) and afterward freeing the product of metallic and combined sodium and drying increased the viscosity to 1800 poises (viscosities at room temperature).

The following examples are illustrative of conditions under which the ketone-amine may be treated with alkali-metal and it is to be understood that other ketone-amines may be treated similarly.

Example 1.—Diphenylamine (approx. 1 mole) and acetone (approx. 2 moles) are reacted at elevated temperature in the presence of a catalytic amount of a reaction catalyst for example, ferrous iodide, by a procedure such as set forth in U. S. P. No. 1,975,167. After cooling and removal of acetone and other low boiling materials by distillation, the product preferably is treated with caustic soda and washed with water until substantially neutral to litmus paper, and filtered if necessary.

100 parts of the acetone-diphenylamine condensation product are heated preferably in an inert atmosphere such as nitrogen, with 1 part of metallic sodium at a temperature above the melting point of the sodium e. g. 150° C. where the ketone-amine is liquid or can be liquefied by warming. The inert gas, for example nitrogen, may be bubbled up through the liquid. The alkali metal is then preferably added in small lumps about ½" in diameter. To insure comingling of the reagents, the mixture is thoroughly mechanically agitated during the reaction, and after 3 hours heating, the reaction mixture is cooled. The mixture is then freed of metallic and combined sodium, a preferred way being to treat the product with ordinary alcohol and/or water, after which the product is water washed, dried and filtered if necessary. The product, a dark brown liquid, is then ready for use in rubber.

Instead of sodium, other alkali metals e. g. potassium, may be used. The amount of alkali metal may be varied as well as the temperature of reaction and reaction medium. It is preferred, however, to have the temperature of reaction higher than the melting point of the alkali-metal. The alkali-metal treatment is applicable to other ketone-amines for example, to condensation products of acetone, ethylidene acetone, phorone, methyl propyl ketone, diethyl ketone, cyclohexanone, dimethyl ketone, diacetone-alcohol, dipropyl ketone, benzophenone, or ethyl-methyl ketone, etc. with aniline, tolylamine, xylylamine, diphenylamine, naphthylamine, dinaphthylamine, phenyl alpha-naphthylamine or phenyl beta-naphthylamine, etc. Other examples of ketone-amines are shown by the prior art including U. S. P. 1,807,355 and British Patent No. 395,322.

The following examples are illustrative of the improvements in rubber products obtainable by the present invention.

In the data below typical tread stock A containing diphenylamine-acetone reaction product untreated with alkali-metal is compared with a similar stock B containing a small amount of sodium-treated diphenylamine-acetone reaction product.

T is tensile in pounds per square inch at break.
E is percent elongation at break.

*Parts by Weight*

|  | A | B |
|---|---|---|
| Smoked sheets | 100 | 100 |
| Carbon black | 45 | 45 |
| Zinc oxide | 5 | 5 |
| Pine tar | 3.5 | 3.5 |
| Zinc soap of cocoanut oil acids | 4.0 | 4.0 |
| Sulfur | 3.25 | 3.25 |
| Mercaptobenzothiazole | 1.25 | 1.25 |
| Diphenylamine-acetone reaction product | 1.00 |  |
| Sodium treated diphenylamine-acetone reaction product |  | 1.00 |

*Unaged*

| Cure in minutes at 30 pounds sq. in. steam pressure | T | E | T | E |
|---|---|---|---|---|
| 30′ | 3560 | 653 | 3840 | 663 |
| 45′ | 4300 | 653 | 4200 | 640 |
| 60′ | 4420 | 636 | 4400 | 610 |
| 75′ | 4220 | 593 | 4340 | 563 |

*Aged 48 hours in oxygen*

|  | T | E | T | E |
|---|---|---|---|---|
| 30′ | 3960 | 643 | 3990 | 663 |
| 45′ | 4050 | 616 | 4000 | 633 |
| 60′ | 3400 | 533 | 4140 | 560 |
| 75′ | 3160 | 500 | 3620 | 533 |

*Aged 24 hours at 212° F.*

|  | T | E | T | E |
|---|---|---|---|---|
| 30′ | 3880 | 576 | 4010 | 616 |
| 45′ | 4010 | 550 | 3960 | 553 |
| 60′ | 3780 | 490 | 3940 | 496 |
| 75′ | 3320 | 443 | 3480 | 456 |

*Flex-Cracking in Kilocycles*

*Unaged*

|  | A | B |
|---|---|---|
| 30′ | 280 | 395 |
| 45′ | 390 | 380 |
| 60′ | 330 | 390 |
| 75′ | 290 | 310 |
|  | 1290 | 1475 |

*Aged 48 hours in oxygen*

|  | A | B |
|---|---|---|
| 30′ | 160 | 365 |
| 45′ | 340 | 350 |
| 60′ | 180 | 280 |
| 75′ | 195 | 190 |
|  | 875 | 1185 |

*Aged 24 hours at 212° F.*

|  | A | B |
|---|---|---|
| 30′ | 210 | 310 |
| 45′ | 260 | 305 |
| 60′ | 180 | 275 |
| 75′ | 175 | 190 |
|  | 825 | 1080 |

The proportion of age-resistor may be varied depending on the type of stock treated and may be employed generally in the same amounts as other antioxidants that are already known.

Any type of rubber stock may be treated, whether it is natural, reclaim, synthetic, or in the form of latex which includes both natural and artificially prepared dispersions. The term rubber is to be construed broadly as including caoutchouc, balata, gutta percha, synthetic rubber-like materials and rubber isomers.

The age-resistor may be incorporated with the rubber on the mill or otherwise before vulcanization or by dipping a vulcanized stock in a solution of the age-resistor or by spraying the same on the vulcanized rubber.

While certain preferred manners of performing the invention have been disclosed to illustrate the invention, it is not desired to limit the invention thereto, for example the precise proportions of materials utilized may be varied, and other materials having equivalent chemical properties may be employed if desired, without departing from the spirit and scope of the invention as defined in the appended claims.

Having thus described my invention what I claim and desire to protect by Letters Patent is:

1. A method of preserving rubber which comprises incorporating therein a product of reaction of an alkali-metal upon a ketone-aromatic amine condensation product.

2. A method of preserving rubber which comprises incorporating therein a product of reaction of an alkali-metal upon an aliphatic ketone-aromatic amine condensation product.

3. A method of preserving rubber which comprises incorporating therein a product of reaction of an alkali-metal upon an aliphatic ketone-aromatic secondary amine condensation product.

4. A method of preserving rubber which comprises incorporating therein a product of reaction of metallic sodium upon an acetone-diphenylamine condensation product.

5. Treating rubber with a product resulting from reacting upon a ketone-aromatic amine reaction product with metallic alkali-metal at a temperature above the melting point of the alkali-metal and subsequently substantially freeing the mix of free and combined alkali-metal.

6. A material, suitable for preserving rubber against deterioration, which is the product resulting from heating an aliphatic ketone-aromatic amine condensation product with metallic alkali-metal and thereafter substantially freeing the product of metallic and combined alkali-metal.

7. A material, suitable for preserving rubber against deterioration, which is the product resulting from heating a dialkyl ketone-aromatic amine condensation product with metallic alkali-metal and thereafter substantially freeing the product of metallic and combined alkali-metal and drying.

8. A rubber age-resistor resulting from reacting metallic alkali metal with a ketone-aromatic amine condensation product.

9. An antioxidant resulting from reacting metallic alkali-metal with an acetone-diphenylamine condensation product.

10. A rubber product comprising rubber and a product of reaction of a metallic alkali metal with a ketone-aromatic amine reaction product.

11. A rubber product comprising rubber and a product of reaction of metallic sodium with a ketone-aromatic amine reaction product.

12. A vulcanized rubber product derived from incorporating in rubber a product of reaction of a metallic alkali metal with a ketone-aromatic amine condensation product.

13. A rubber product comprising rubber and a product of reaction of metallic sodium with an acetone-diphenylamine condensation product.

14. A vulcanized rubber product derived from incorporating in rubber a product of reaction of metallic sodium with an acetone-diphenylamine condensation product.

LOUIS H. HOWLAND.